April 7, 1942.  L. HORVITZ  2,278,929
GEOCHEMICAL PROSPECTING
Filed Nov. 18, 1939
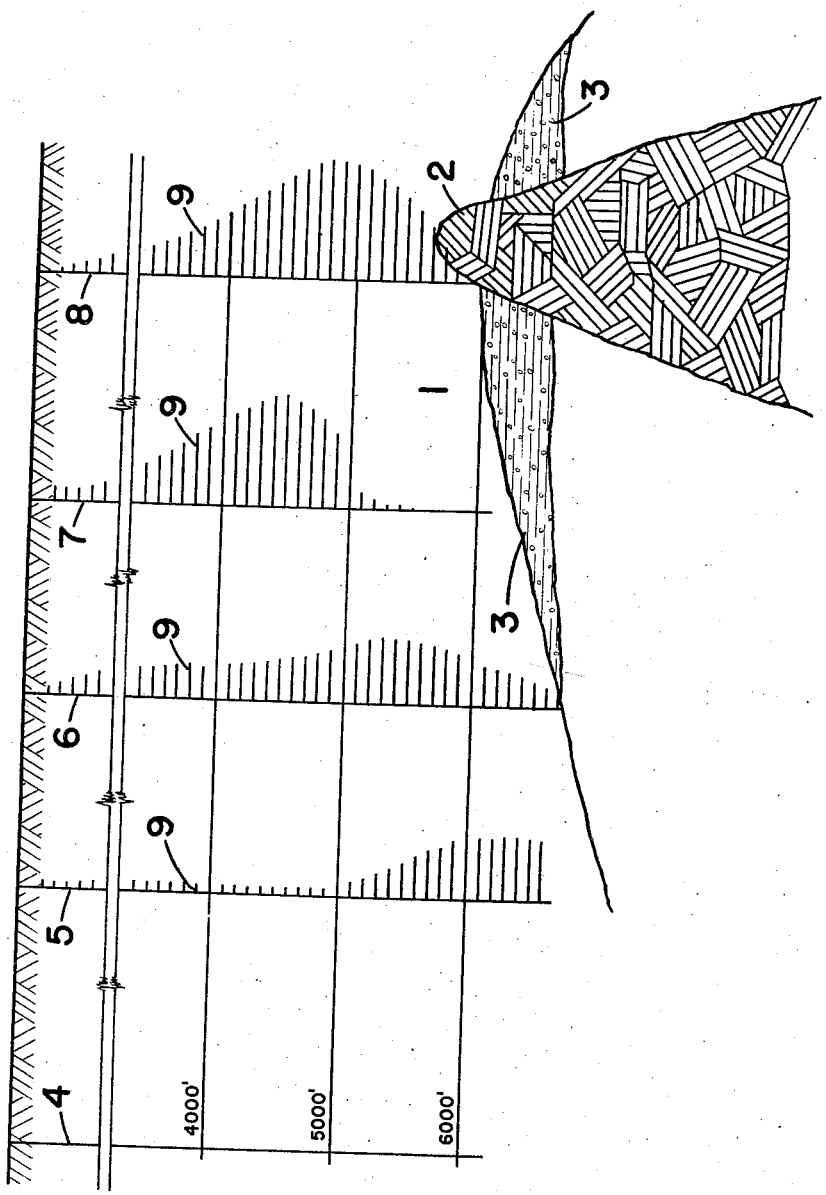
Leo Horvitz INVENTOR.
BY P. L. Young
ATTORNEY.

Patented Apr. 7, 1942

2,278,929

UNITED STATES PATENT OFFICE 2,278,929

GEOCHEMICAL PROSPECTING

Leo Horvitz, Houston, Tex., assignor to Esme E. Rosaire, Houston, Tex.

Application November 18, 1939, Serial No. 305,063

16 Claims. (Cl. 23—230)

This invention is directed to geochemical prospecting for the location of subterranean deposits of mineral matter, particularly mineral oil, and is especially directed to that type of geochemical prospecting in which soil samples are collected in a region to be investigated and subjected to a treatment for the recovery therefrom of gas which is analyzed, particularly for hydrogen.

In my copending application Serial No. 156,670, filed July 31, 1937, issued December 19, 1939, as U. S. Patent No. 2,183,964, I have disclosed a method for geochemical prospecting according to which soil samples are collected and treated for the evolution of gases which are analyzed for hydrogen. In this application it is mentioned that in order to increase the amount of gas liberated, it is desirable to treat the soil samples with acid. To the extent that this present application is directed to a method for treating a soil sample for the liberation therefrom of gas which is analyzed for hydrogen, this application is a continuation-in-part of application Serial No. 156,670.

According to the present invention geochemical prospecting is conducted by collecting samples in a region to be investigated, subjecting the samples to a treatment suitable for the disruption of the physical structure of carbonates contained therein, and examining the thus treated samples for the presence of free metal. The analysis for free metal may be carried out by treating the samples with an acid, particularly an acid which will react with the metal with the evolution of hydrogen, such as hydrochloric acid. Other acids which may be employed are sulphuric, phosphoric, and organic acids such as acetic. It may be noted here that concentrated nitric acid cannot be employed for this purpose.

In some cases it may be desirable to determine whether or not the hydrogen given off from the sample existed as free hydrogen or resulted from the action of the acid upon the free metal. This may be accomplished by first subjecting the sample to treatment with an agent which will disrupt the physical structure of water insoluble carbonates without reacting with free metal with the evolution of hydrogen. Such a reagent is an aqueous solution of ammonium chloride which, when employed at room temperature, will not react with free metal. The sample can be treated at room temperature with ammonium chloride and then carefully washed to remove the ammonium chloride, and then treated with hydrochloric acid. If no hydrogen is given off as a result of the ammonium chloride treatment, and hydrogen is given off as a result of the acid treatment it is certain that the hydrogen resulted from the action of the acid on free metal.

Another method that may be used to distinguish free hydrogen from free metal is by the following procedure in which duplicate samples are used. One sample is treated with a concentrated aqueous solution of nitric acid while the other is treated with an aqueous solution of an acid such as hydrochloric, sulfuric, phosphoric, etc. If the sample treated with nitric acid yields no hydrogen, but the one treated with, say, phosphoric acid, does, then it may be correctly concluded that the evolved hydrogen was produced by the interaction of the acid with free metal.

A third method by which it has been demonstrated that free metal exists in samples is to take a duplicate portion of a sample which had yielded considerable quantities of hydrogen upon treatment with hydrochloric acid or phosphoric acid, and treat it with an aqueous solution of copper sulfate. After allowing the mixture to stand at room temperature for several hours, treat it with phosphoric acid in a closed system at reduced pressure. In a series of eight experiments of this type on samples which yielded hydrogen with HCl only one sample yielded hydrogen, indicating that free metal was present in all but one of the samples.

Another method for determining the amount of free metal, if any, in the sample is to subject the sample to the treatment of an agent such as aqueous ammonium chloride at room temperature while passing an inert or reducing gas through the sample. This may be accomplished by making a slurry of the sample first, before the addition of ammonium chloride. The sample is then quickly filtered, preferably in a reducing atmosphere, and the residue is examined microscopically for the presence of free metal particles.

The free metal present may also be determined electrolytically. That is to say, the sample may be treated with a chemical which will decompose the carbonates without dissolving free metal in the presence of a solution of a salt of a metal which occurs in the electromotive series lower than the metal whose presence is suspected. Any free metal then will displace the lower metal from its salt and go into solution as that salt. The sample can then be washed carefully to remove all of the soluble salt and the solution subjected to electrolysis under conditions suitable for the deposition of the suspected free metal. For example, if iron is suspected the solution is electrolyzed by the application of two volts to electrodes of such dimensions as to provide a current density of 0.1 amps.

The quantity of the free metal dissolved as a salt according to the technique just described may also be determined by titration with $K_2Cr_2O_7$ or $KMnO_4$ in the known manner. The chemical which is capable of decomposing carbonates without dissolving free metal utilized in this combination of steps is not an acid, but can be an aqueous solution of a salt, such as ammonium chloride.

A particularly useful technique for the determination of free metal is to apply to the soil sample a solution of silver nitrate containing a known quantity of silver nitrate acidized with nitric acid, sufficient free nitric acid being present to decompose carbonates in the soil. When the carbonates are destroyed any free metal present, which will ordinarily be higher in the electromotive series than silver, will displace the silver from solution. The resulting solution is then titrated for silver and the amount determined, subtracted from the known amount of silver added originally, yields a figure indicative of the amount of free metal in the soil. In applying this technique it is preferable to first wash the sample thoroughly with water to remove all water soluble salts therefrom.

As is usual in methods of this type, better results are obtained if the samples are collected at some distance below the surface of the ground where surface prospecting is being conducted. The samples should be taken at a depth below that at which the soil is penetrated by air as a result of "breathing." Depths below four feet are usually satisfactory, but depths as great as two hundred feet may be employed. Generally samples are collected at depths ranging from ten to twenty feet.

The method of the present invention yields valuable information when applied to samples taken at successive depths along a borehole during the drilling of an oil well. These samples may be cores taken in the course of drilling, side wall cores, taken particularly for the purpose of analysis, or cuttings brought to the surface from the drill bit by the drilling fluid. These cuttings are readily separable from the drilling mud and have been separated for many years for paleontological examination. When the present method is applied to such samples it yields information concerning the potential productivity of the well being drilled, the desirability of the location of the well in the area selected, the approach of the drill bit to a producing formation, and the position of the well with respect to the edge or center of the producing zone.

It will be understood, of course, that in the production of well logs the cuttings are correlated with depth of the hole in any one of the usual ways well known in the art. That is to say, it is well known in text books on drilling practice how to determine the depth of a formation from which the cuttings in any sample of mud are derived. This depth determination has been practiced for a great many years for the purpose of identifying cuttings for paleontological purposes.

A simple and convenient method for determining the depth from which the cuttings in a given sample of mud come is described on pages 66 et seq. of Petroleum Production Methods, by John R. Suman, third edition, published by the Gulf Publishing Company of Houston, Texas, in 1933. The author gives a formula for calculating the time to wait for cuttings from a given depth to reach the surface for any depth of hole, radius of hole, diameter of drill stem, etc. Most of the factors in the formula remain constant for a given location whereby the determination of the depth from which the cuttings are obtained is reduced to the counting of pump strokes and observation of the depth of drilling as indicated on the grief stem or Kelly joint. The author gives charts showing the time to wait for collection of a sample of a desired formation in holes of different radius with drill stems of different diameter. This material is reproduced at pages 107–109 of Bulletin 201 of the Bureau of Mines, by R. E. Collom.

The manner in which all of the aforesaid information is secured will be apparent from the following detailed description of the accompanying drawing in which the single figure is a vertical section through earth containing an oil producing zone and which bears logs illustrative of the type prepared by the method of the present invention indicating the distribution of hydrogen, as found by treating soil samples with acid, over the producing area. These logs are idealized cases based on a large number of actual logs.

Referring to the drawing in detail, numeral 1 designates the earth which is shown to include a salt dome 2 on the flanks of which is an oil producing sand 3. Numerals 4, 5, 6, 7 and 8, respectively, represent logs prepared from data obtained by analyzing soil samples from boreholes drilled in the vertical positions of the respective logs. Each of logs 5, 6, 7 and 8 is provided with spaced horizontal lines 9, indicating hydrogen recovered from the acid treatment of samples, the scale employed being about 0.002% by weight per inch.

As will be seen, samples taken from borehole 4 yield no hydrogen upon acid treatment. This borehole may be assumed to be about two miles from the outer edge of producing zone 3. Borehole 5 may be taken to be about a half mile from the outer edge of producing zone 3. Samples from this borehole yielded some hydrogen upon acid treatment. The amount found is very small throughout most of the length of the borehole showing a substantial increase at a depth between about 5000–6000 feet.

Well 6 is drilled near the edge of production. As can be seen, at about 5300 feet the hydrogen recovered is a maximum and then falls off gradually to a minimum at the level of production.

Borehole 7 is drilled substantially in the center of production. The amount of hydrogen recovered from the samples from this borehole reaches a maximum at about 4500 feet but falls off rapidly to zero below 5000 feet.

Borehole 8 is drilled along the inner edge of production and gives a hydrogen log quite similar to that given by borehole 6, differing therefrom only in that at a depth below about 3500 feet the hydrogen liberated from samples from borehole 8 is greater in amount than that liberated from borehole 6.

One of the widest applications of the present method is to the re-examination of wells which have been abandoned for sometime. Ordinarily the driller of such wells may retain samples of cuttings and cores throughout its length. These samples have usually been exposed to the atmosphere for long periods and are ordinarily dry. The application of suction and moderate heat to such samples ordinarily yields no gas. By the addition of acid, however, these samples have been found to give up hydrogen, indicating in the sample the presence of free metals.

It will be apparent that many changes will be made in the procedure described without departing from the scope of the present invention. For example, instead of decomposing carbonates or destroying their physical structure by the methods heretofore mentioned, it is possible to subject the soil sample to a heat treatment at a temperature sufficiently high to decompose any carbonates contained therein. For the purpose of the present invention, such a heat treatment is conducted in an atmosphere of inert gas, such as nitrogen. In this procedure reducing gases should not be employed because they might result in the reduction of metal oxides present as such in the samples and lead to erroneous conclusions. This heat treatment is particularly advantageous when it is desired to examine the samples microscopically for the presence therein of free metals.

In the foregoing description iron has frequently been referred to as a free metal found in soil. Other free metals are capable of existing. In general, these may be termed metals which are above hydrogen in the electromotive series, though naturally those metals whose oxides are reduced only with great difficulty are not included.

In the foregoing description it has been assumed that free metals exist in the earth in association with carbonates. It is to be understood that the present invention contemplates the examination of soil samples or borehole samples for free metals whether they are present in such samples in connection with carbonates or not. It is not inconceivable that these free metals may acquire a thin superficial coating of oxide, leaving the core of free metal the presence of which is indicated by the treatments described above. Under suitable subsurface conditions it may even be that the free metals remain as such without any protective coating, particularly when it is realized that the atmosphere at lower levels is always of a reducing nature over a petroliferous deposit.

Wherever in the foregoing description reference is made to determination of hydrogen, it will be understood that known methods of determination are referred to. Among these may be mentioned spectroscopy, especially analysis by a mass spectroscope, and combustion methods. Typical of the latter is an operation according to which evolved gases are treated for the removal of carbon dioxide and water and then for the separation of hydrogen and methane from heavier hydrocarbons by fractionation followed by combustion of hydrogen and methane. Any water resulting from this combustion over and above that attributable to methane is a measure of the hydrogen content of the gas. The hydrogen-methane fraction can also be passed over heated copper oxide and the resulting water used as a direct measure of hydrogen content.

The nature and objects of the present invention having been thus described and illustrated, what is claimed as new and useful and is desired to be secured by Letters Patent is:

1. A method for locating subterranean carboniferous deposits which comprises systematically collecting samples of soil at spaced intervals in an area to be explored, subjecting each sample to the action of an acid capable of reacting with a free metal to liberate hydrogen, and measuring the hydrogen evolved.

2. A method according to claim 1 in which the free metal is iron and the acid is hydrochloric.

3. A method according to claim 1 in which the samples are collected at a depth of at least ten feet.

4. A method for logging wells drilled for the production of petroleum which comprises systematically collecting earth samples from spaced points along the borehole and quantitatively examining these samples for their content of free metal.

5. A method according to claim 4 in which the free metal is iron.

6. A method for locating subterranean petroliferous deposits which comprises systematically collecting a plurality of samples of soil at spaced intervals in an area to be explored, and quantitatively examining said samples for their content of a free readily-oxidizable metal having a readily reducible oxide.

7. A method according to claim 6 in which the free metal is iron.

8. A method according to claim 6 in which the samples are collected at a depth of at least four feet.

9. A method according to claim 6 in which the samples are collected at a depth of at least ten feet.

10. A method for prospecting for subterranean carboniferous deposits which comprises systematically collecting samples of soil at spaced intervals and at a depth below "breathing" depth in an area to be explored, subjecting each sample to a treatment sufficient to disrupt the physical structure of carbonates contained therein and quantitatively examining the thus treated samples for the presence of free metal.

11. A method for logging wells drilled for the production of petroleum which comprises systematically collecting samples from spaced points along the borehole, treating each sample with an acid capable of reacting with free metal to liberate hydrogen, and measuring the hydrogen evolved.

12. A method according to claim 11 in which the acid is hydrochloric.

13. A method for producing a well-log which comprises systematically collecting samples of earth from spaced points along the length of the well, determining the free metal content of each sample and correlating said free metal content with depth on a chart.

14. A method for logging a well drilled for the production of petroleum which comprises systematically collecting cuttings derived from successively greater depths in the borehole during the drilling operation and quantitatively examining said cuttings for their content of free metal.

15. A method according to claim 14 in which the free metal is iron.

16. A method for logging a well drilled for the production of petroleum which comprises systematically collecting cuttings derived from successively greater depths in the borehole during the drilling operation, subjecting a known weight of cuttings from each depth to the action of an acid capable of reacting with a free metal to generate hydrogen, and measuring the evolved hydrogen,

LEO HORVITZ.